R. E. HELLMUND.
CONTROL SYSTEM.
APPLICATION FILED NOV. 25, 1914.
1,317,292.
Patented Sept. 30, 1919.
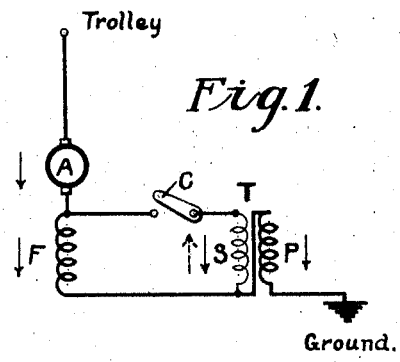
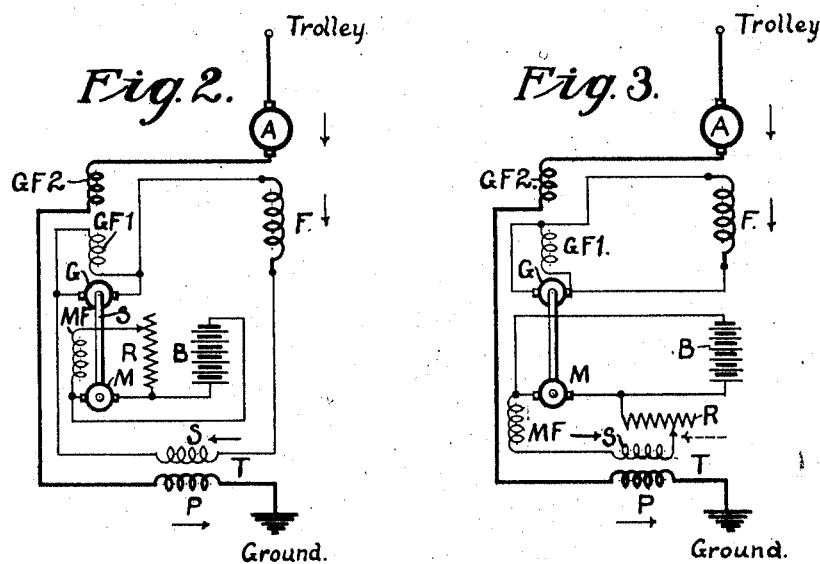
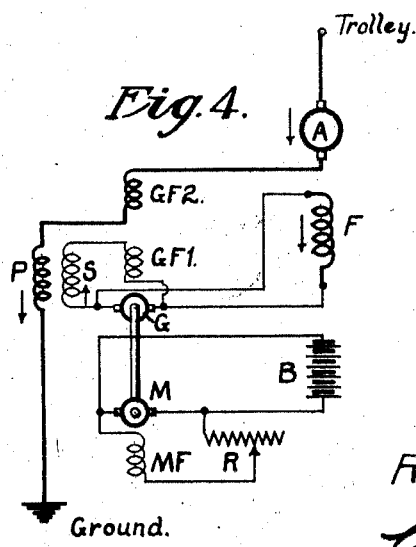
WITNESSES:
R.J. Fitzgerald
W.R. Coley
INVENTOR
Rudolph E. Hellmund.
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,317,292.         Specification of Letters Patent.     Patented Sept. 30, 1919.

Application filed November 25, 1914. Serial No. 873,918.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Control Systems, of which the following is a specification.

My invention relates to systems of control, and it has special reference to means for obviating "flash-over" conditions in electric railway motors and the like.

In direct-current electric railway systems, when the supply circuit energy is suddenly resumed after a temporary interruption, such as that occasioned by passing over a section break, the rush of current readily effects a building up of flux in the laminated armature core, but the solid steel portion of the frame that is usually included in the magnetic field circuit causes eddy currents to arise and, therefore, an equally rapid building up of the field flux is not effected. The armature ampere-turns thus momentarily predominate over the field ampere-turns to such an extent as to cause an unduly high voltage between the commutator segments of the motor and, in some cases, to even cause "flash-over" of the machine. The remedy resides in effecting an additional increase of field current at the instant of resumption of the supply-circuit energy to prevent this excess ratio of armature to field ampere-turns.

The object of my present invention is to provide a simple and inexpensive means for reliably and effectively preventing the occurrence of "flash-over" conditions in electric motors by automatically effecting a temporary increase of field current upon the resumption of supply-circuit energy after a temporary interruption thereof.

According to my invention, I provide inductive means, preferably a transformer, having its secondary winding adapted to influence the excitation of the motor field magnet winding and having its primary winding connected in circuit with the motor armature to receive energy from the direct-current supply circuit, thus normally producing a substantially negligible effect on the secondary winding, but whereby, upon a sudden resumption of supply circuit energy after a temporary interruption thereof, the transformer secondary winding is energized from the primary winding to effect an instantaneous increased excitation of the field winding. My invention may be employed in various ways. Such a system may comprise the use of a secondary transformer winding in either parallel or series relation to the main motor field winding or the use of a motor-generator set to excite the field winding, the secondary transformer winding being suitably connected in the shunt field winding of the motor or generator. In this way, the main motor field winding is suitably energized upon the resumption of supply-circuit energy and irrespective of the rate of building-up of flux from the motor current, and thus "flash-over" conditions are effectively prevented.

In the accompanying drawing, Figure 1 is a diagrammatic view of a system of control embodying my invention; and Figs. 2, 3 and 4 are similar views of modified systems that also embody my invention.

Referring to Fig. 1, the system here shown comprises a suitable supply circuit including conductors respectively marked "Trolley" and "Ground"; an electric motor having an armature A and a series-connected field magnet winding F; a transformer T having a primary winding P that is connected in series-circuit relation with the motor, and a secondary winding S that is adapted to be connected, through a suitable switch C, in parallel relation with the field magnet winding F.

The operation of the system, in so far as it concerns my present invention, may be briefly set forth as follows: The motor is started preferably with the switch C occupying its open position, whereby the secondary winding S of the transformer is deënergized and the primary winding P, through which current normally flows in the direction of the corresponding solid arrow, has substantially negligible effect upon the secondary winding, inasmuch as the changes in the motor current occur at a relatively slow rate, as compared with the current variations that would be effected by the flow of alternating current in the transformer primary winding, as will be understood. After the motor has been accelerated to a predetermined speed in any suitable manner, which it is not deemed necessary to describe in detail here, the switch C may be closed to connect the secondary winding S across the field magnet winding F, whereby current flows through the secondary winding in the direction of the corresponding solid arrow, and, the field strength of the motor being weakened, the motor speed increases a predetermined amount, in accordance with familiar principles.

Assuming that the supply circuit energy is interrupted and then suddenly resumed shortly afterward, the motor armature flux will build up at a greater rate than the field flux, as hereinbefore pointed out, and a certain amount of flux will be immediately created by the current in the primary winding P of the transformer. A corresponding opposing or counter-flux will also immediately be set up in the secondary winding S of the transformer to send a current therethrough in the direction of the dotted arrow, which current is added to the simultaneous initial field winding current to suitably increase the field strength of the motor and thereby prevent the "flash-over" conditions hereinbefore mentioned.

Reference may now be had to Fig. 2 of the drawing, in which is shown a system comprising the supply-circuit conductors Trolley and Ground, a motor having an armature A and a field winding F, a transformer T and a motor-generator set, coupled in any suitable manner, as by a shaft $s$, the generator armature G of which is adapted to energize the field winding F, which, in this case, is not included in the same circuit as the armature A, and the motor armature M of which is adapted to be energized from a suitable storage battery B or other convenient source of energy. The motor of the motor-generator set is provided with a shunt field winding MF, the strength of which may be varied by a suitable resistor R, and the generator is provided with a shunt field winding GF1 and a second field winding GF2 that is connected in series relation with the armature A and the primary winding P of the transformer.

The purpose of the auxiliary field winding GF2, which, in the present system and also in those to be subsequently described, is energized in accordance with the main-armature or load current, is to so supplement the action of the auxiliary shunt field winding GF1 as to render the energization of the main field winding F normally dependent upon variations of such load current. Upon the resumption of supply-circuit energy, after a temporary interruption thereof, the previously-described inherently sluggish action of the main field winding tends to prevent such normal action for a short time, during which initial period, the transformer T acts to temporarily effect the desired energization of the main field winding F in the same direction as the normal excitation upon an increase of the load current, as more fully set forth below.

Assuming the system to be normally operating with current flowing in the respective circuits in the directions indicated by the arrows, the operation of the system, with respect to the obviation of "flash-over" conditions, may be described as follows: as in the case shown in Fig. 1, the primary winding P of the transformer normally has substantially negligible effect upon the secondary winding S, but when the supply circuit energy is suddenly resumed, after a temporary interruption, the relatively great instantaneous change in the flux emitted by the primary winding P sets up a corresponding and opposing flux in the secondary winding S which thereby acts in effect as an additional source of electromotive-force in the circuit of the main motor field winding F; consequently increasing the field strength of the main motor to a predetermined degree.

Another system for accomplishing the same object is illustrated in Fig. 3, the apparatus employed being identical with that shown in Fig. 2, but the secondary transformer winding S is connected in circuit with the shunt field winding MF of the motor-generator set in such a way as to receive a current that flows in the same direction as the current in the primary winding P, as indicated by the solid arrows.

Upon a sudden resumption of supply-circuit energy after a temporary interruption thereof when the system illustrated is normally operating, the sudden change of flux in the primary winding P of the transformer sets up an opposing flux in the secondary winding S, as indicated by the dotted arrows, which flux thus serves to weaken the current flowing through the shunt field winding MF of the motor generator. The speed of the set is thereby correspondingly increased to also increase the voltage delivered by the generator armature G, and, consequently, the field strength of the main motor field winding F.

Still another system for effecting the desired object is illustrated in Fig. 4, wherein the secondary winding S of the transformer T is connected in series relation with the shunt field winding GF1 of the generator G, the remainder of the system comprising the same apparatus as that illustrated in Fig. 2 and Fig. 3. The currents in the various circuits normally flow in the directions indicated by the respective arrows.

When the supply-circuit energy is suddenly resumed, after being temporarily interrupted, the flux created in the primary winding P causes a corresponding and opposing flux to build up in the secondary winding S, whereby the current flowing through the generator shunt field winding GF1 is correspondingly increased, and the generator armature voltage, together with the current flowing in the main motor field winding F that is connected across the armature G, are also increased to a predetermined degree.

Although it is true that the shunt field winding of a dynamo-electric machine may be considered as indirectly dependent upon, or energized in accordance with, the load current of the machine, I desire it to be understood that such a construction is to be considered as excluded by the claims that specify "a field winding normally energized in accordance with the load current."

I do not wish to be restricted to the specific circuit connections or arrangement of parts herein set forth, as modifications thereof may obviously be made within the spirit and scope of my invention. I desire, therefore, that only such limitations shall be imposed as are indicated in the appended claims.

I claim as my invention:

1. In a system of control, the combination with a direct-current supply circuit, and a dynamo-electric machine having an armature and a field magnet winding, of an auxiliary motor-generator set having its generator connected to excite said field-magnet winding, and a transformer having its secondary winding associated with said motor-generator set in such manner as to influence the excitation of said field-magnet winding and having its primary winding connected in series-circuit relation with said armature to the supply circuit and normally producing substantially negligible effect on said secondary winding for effecting an increased excitation of the field-magnet winding upon a sudden resumption of supply-circuit energy, after a temporary interruption thereof.

2. In a system of control, the combination with a dynamo-electric machine having an armature and a main field-magnet winding, a motor-generator set having the generator thereof connected to excite said field winding, and an auxiliary source of energy adapted to energize the motor of said motor-generator set, of a transformer having the primary winding connected in series with the armature of the first mentioned machine and the secondary winding connected in series with the main field winding for preventing abnormal ratio of armature ampere-turns to field-winding ampere-turns upon the resumption of supply-circuit energy after temporary interruption thereof.

3. In a system of control, the combination with a dynamo-electric machine having an armature and a field-magnet winding, of an auxiliary motor-generator having its generator element connected to excite said field-magnet winding, and a transformer having its secondary winding associated with said motor-generator in such manner as to influence the excitation of said field-magnet winding and having its primary winding connected in series-circuit relation with said armature and adapted to produce a field-excitation-increasing effect upon the secondary winding under predetermined conditions.

4. In a system of control, the combination with a supply circuit and a dynamo-electric machine having an armature and a field-magnet winding, of an auxiliary motor-generator having its generator element connected to excite said field-magnet winding, an auxiliary source of energy for energizing the motor element of said motor-generator, and a transformer having its secondary winding associated with said motor-generator in such manner as to influence the excitation of said field-magnet winding and having its primary winding connected in series-circuit relation with said armature and adapted to produce a field-excitation-increasing effect upon the secondary winding under predetermined abnormal conditions.

In testimony whereof, I have hereunto subscribed my name this 19th day of Nov., 1914.

RUDOLF E. HELLMUND.

Witnesses:
A. J. BROOMALL,
B. B. HINES.